Jan. 14, 1930.   A. ESAU ET AL   1,743,124
ARRANGEMENT FOR ELIMINATING ATMOSPHERIC DISTURBANCES
Filed July 28, 1925
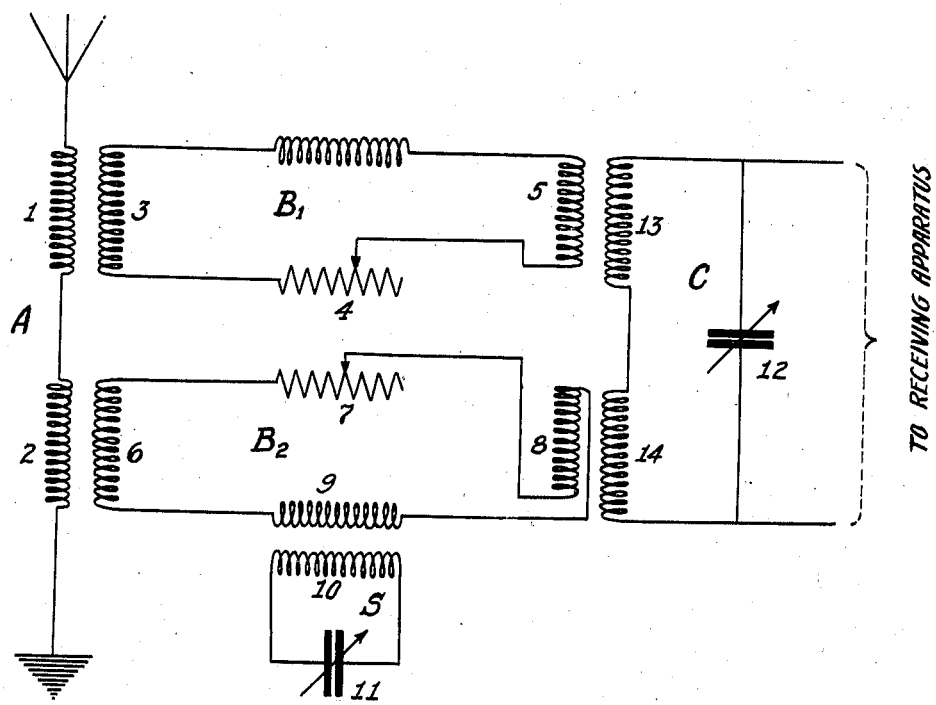
INVENTOR
ABRAHAM ESAU &
BY FRIEDRICH LANGE
ATTORNEY Patented Jan. 14, 1930

1,743,124

UNITED STATES PATENT OFFICE

ABRAHAM ESAU AND FRIEDRICH LANGE, OF BERLIN, GERMANY, ASSIGNORS TO GE-SELLSCHAFT FÜR DRAHTLOSE TELEGRAPHIE M. B. H. HALLESCHES, UFER, OF BERLIN, GERMANY, A CORPORATION OF GERMANY

ARRANGEMENT FOR ELIMINATING ATMOSPHERIC DISTURBANCES

Application filed July 28, 1925, Serial No. 46,541, and in Germany August 12, 1924.

Our invention relates to the radio art and more particularly to a method and means for eliminating certain disturbances caused by natural electric phenomena in the ether, commonly called static.

An object of the invention is to provide a method and means for effectively eliminating these disturbances without eliminating the desired signal in a simple and efficient manner.

Other objects will be apparent from the following description and claims when considered with the accompanying drawing in which the single figure is a circuit diagram embodying our invention.

The present invention relates to a differential connection for a receiving arrangement for the purpose of avoiding atmospherics in the reception of wireless signals. With the end in view of insuring reception as free from disturbances as possible, it has previously been suggested to feed the oscillations from the antenna by way of two aperiodic intermediate or transfer circuits coupled in contrary sense to a common receiving circuit. The inductance, capacity and resistance was so chosen in these two intermediate or transfer circuits, that no phase compensation was produced in the case of an impressed signal oscillation, while a disturbance which is regarded as an aperiodic impulse, reached the receiving circuit by way of the said two circuits with a certain time displacement, but always in opposite sense.

The method described is attended with practical difficulties on account of the high resistance values which are required in these transfer circuits in order that the effect aimed at may be obtained. According to the invention, however, freedom from disturbances is attained by making only one of the transfer circuits aperiodic, whereas the second transfer circuit which is coupled in opposite sense with the aerial or with the common receiving circuit, is united with an oscillation circuit which is tuned to the signal wave.

This oscillation circuit must have as low damping as possible. It may be inserted directly in the second transfer circuit and form part of the line, or else it may be inductively coupled with the second transfer circuit as illustrated in the drawing. The said oscillation circuit serves as a block for the incoming signal wave, and, as a consequence, it diminishes the intensity of the incoming signal oscillations transferred thru this transfer circuit. Atmospheric disturbances, therefore, which are aperiodic in nature or of a frequency differing from that of the waves to be received, will be passed on over both paths practically at equal intensity, and will be compensated by the differential coupling, while for the wave to be received practically only one of said paths will pass an appreciable amount of energy.

Referring now more particularly to the drawing, A denotes the antenna circuit having coils 1 and 2 connected therein. Coupled to the antenna circuits are two parallel paths denoted by $B_1$ and $B_2$. The circuit $B_1$ includes the coil 3 for inductive coupling to coil 1. Circuit $B_1$ also includes a variable resistance 4 and a second coupling coil 5.

Similarly circuit $B_2$ contains a coupling coil 6 for coupling the circuit to coil 2. Circuit $B_2$ also contains a variable resistance 7, a second coupling coil 8 and a third coupling coil 9. Coupled to coupling coil 9 by means of coupling coil 10 is circuit S including coupling coil 10 and variable condenser 11. Circuit S is tuned to the desired signal.

Circuit C is the receiving circuit and is tuned to the desired signal. The circuit C comprises variable condenser 12, coupling coil 13 for coupling to coil 5 and coupling coil 14 for coupling to coil 8. It should be noted that coupling coils 5 and 8 are arranged so that the energy impressed upon circuit C from circuits $B_1$ and $B_2$ will be in opposing sense.

The receiving apparatus, such as a radio frequency amplifier (not shown) or a detector (not shown), will be suitably connected across the terminals of condenser 12.

Having described our invention we are entitled to all modifications thereof as fall fairly within the spirit and scope of our invention as defined by the following claims.

1. In combination, an energy pick-up conductor, a receiving circuit tuned to radio frequency oscillations of a desired signal, an aperiodic path connecting said conductor and said receiving circuit, and a second path largely opaque to the designed signal, also connecting said conductor and said receiving circuit.

2. A circuit arrangement comprising an antenna circuit and a tuned radio frequency receiver circuit, an aperiodic intermediate transfer circuit coupled to both antenna and receiver circuits, and a second intermediate transfer circuit also coupled to both antenna and receiver circuits having a loop circuit tuned to the desired signal coupled thereto.

3. A circuit arrangement adapted to eliminate currents due to atmospheric disturbances in the reception of radio signals, comprising an antenna circuit and a receiver circuit, a pair of transfer circuits, including an inductance and an adjustable resistance coupled to said antenna circuit and to said receiver circuit in opposite sense, and a rejector circuit coupled to one of said transfer circuits, whereby the receiver circuit is capable of utilizing only the radio frequency current of the desired signal.

4. A circuit arrangement comprising an antenna circuit, a pair of intermediate transfer circuits coupled thereto, one being aperiodic and the other being coupled to a rejector circuit tuned to the desired signal, and a receiver circuit also tuned to the desired signal, said transfer circuits being coupled to said receiver circuit in opposite sense, so that any frequency different from that of the signal to be received will act on both transfer circuits and neutralized in the receiver circuit.

5. In a circuit arrangement for reducing the effect of atmospheric disturbances, in combination, a single antenna circuit, a pair of aperiodic circuits coupled thereto, a rejector circuit tuned to signal frequency coupled to one of said aperiodic circuits, and a receiving circuit tuned to signal frequency differentially coupled to said aperiodic circuits.

6. In a circuit arrangement for reducing the effect of atmospheric disturbances, in combination, a single antenna circuit, a pair of parallel aperiodic circuits coupled thereto, each of said circuits including an adjustable resistance, a circuit tuned to signal frequency and having as low a damping as possible coupled to one of said aperiodic circuits, and a receiving circuit tuned to signal frequency differentially coupled to both said aperiodic circuits.

ABRAHAM ESAU.
FRIEDRICH LANGE.